April 1, 1969     R. C. FFOOKS     3,435,983

TANK KEYWAY AND WELD TESTER

Filed June 1, 1966

INVENTOR
Roger C. Ffooks

BY *Max L. Libman*

ATTORNEY

# United States Patent Office 3,435,983
Patented Apr. 1, 1969

3,435,983
TANK KEYWAY AND WELD TESTER
Roger C. Ffooks, Tittlesfold Farm, near Billingshurst, England, assignor to Conch International Methane Limited, Nassau, Bahamas, a Bahamian company
Filed June 1, 1966, Ser. No. 554,569
Claims priority, application Great Britain, July 13, 1965, 29,629/65
Int. Cl. B65d 7/34
U.S. Cl. 220—80       2 Claims

ABSTRACT OF THE DISCLOSURE

A marine tanker for the bulk transport of liquefied gases comprising in a thermally insulated hold a self-supporting metal tank of which at least one portion is formed by welding the edges of adjacent plates so as to form a non-expanding joint, wherein a hollow section extending externally of the tank is provided along the weld to enable the application of fluid pressure to identify any flaw in the weld, wherein the hollow section associated with the weld is adapted and arranged to form part of a key and keyway means retaining the tank against undesired displacement.

---

The bulk storage of liquids at temperatures far removed from ambient temperature, such as liquefied natural gas, has long been recognized as imposing novel technical problems calling for exceptional care in the construction of the storage reservoir. At such temperatures, large dimensional changes are encountered and consequential stresses in the walls of the tank must be allowed for in the design, location and insulation of the tank.

The technical problems are somewhat greater when the tanks are used for storing and transporting such liquid, as for instance in a marine tanker adapted for such purposes. In such use steps are necessary or desirable to safeguard the storage tank from lateral displacement while permitting unrestricted contraction and expansion of the container. Consequently in a marine tanker of this type it has been proposed to provide a self-supporting tank with keys adapted to slide in keyways so that contraction or expansion of the tank is unrestrained while holding the tank against lateral displacement. In this connection reference can be made to proposals providing such means, as for instance proposals in U.S. Patents Nos. 3,104,025 and 3,150,797.

In the construction of tanks for such bulk storage special care is needed both in regard to constructional materials, and to methods of construction. As regards construction materials, aluminum or aluminum alloy tanks and 9% nickel steel tanks have, for example, been proposed as suitable for use at very low temperatures. Where such tanks are formed by welding it is necessary to test the weld and further testing may be desirable periodically to check the behavior of the weld after a period of service. Such testing operation in the case of a large storage tank with a very considerable length of weld is a costly and laborious operation. Moreover, conventional testing procedure which involves filling such such tanks with water is hardly feasible in the case of a tank constructed in the hold of a ship since the inspection difficulties when the tank is full become insuperable. For these reasons means whereby such testing operation can be facilitated are much to be desired.

According to the present invention, a self-supporting metal tank for the bulk storage of liquids is formed by welding the edges of adjacent plates so as to form a non-expanding joint in at least a portion of the tank, and providing a hollow section along the said weld to enable the application of fluid pressure to identify any flaw in the weld. Such hollow section may for instance be provided by welding a channel-shaped or concave-member to the tank on either side of the said weld.

Additional advantage can be secured in the case of a marine tanker for the bulk transport of liquefied gases comprising one or more thermally insulated cargo holds housing one or more self-supporting tanks. When such a tank is formed and provided with a hollow section along a weld as already set forth, the weld is so adapted and arranged that the associated hollow section also forms part of key and keyway means retaining the tank against undesired displacement. Thus the welds and their associated hollow sections may be arranged on the top or bottom of the tank so as to provide keys permitting lateral displacement in specific directions but not in others. Again, welds and their associated hollow sections may be so arranged on one or more side walls as to permit vertical movement of the tank under thermal contraction and expansion while resisting some or all lateral displacement. Moreover, it will be apparent that the welds and associated hollow sections on say the base of a large tank may form an intersecting pattern which can be adapted to permit such contraction and expansion as may arise through thermal changes while resisting any lateral thrusts when the vessel is at sea. At the same time an intersecting pattern wherein the spaces in the hollow sections are in communication facilitates the simultaneous fluid pressure testing of the intersecting pattern of welds. It will also be apparent that the external form of the hollow section can be varied considerably so that it may either serve as a key or as a keyway, although the formed is the more readily attainable and simpler expedient, and is preferred.

The invention will now be described by reference to the accompanying drawings wherein FIG. 1 represents a cross section through a welded wall of a tank and associated hollow section;

Figure 1:
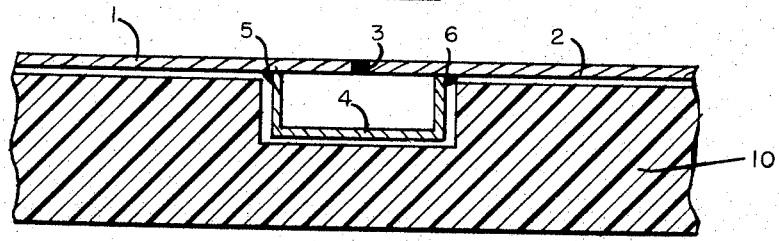

Turning to FIG. 1, the wall of a self-supporting tank comprises two plates 1 and 2 welded along their abutting edges by a weld 3. Overlying this weld is a channel-shaped member 4 welded to the tank wall by welds as at 5 and 6, thereby providing a hollow space running the length of weld 3. This space can be made fluid-tight by suitable end plates, not shown, and provided with pressure fluid means exemplified by hose connection 11, which may be valve-controlled, whereby fluid pressure may be applied to test the weld 3 as and when required.

Furthermore, the channel sections 4 and 7 add to the rigidity of the tank, and thus serve as structural elements.

Figure 2:
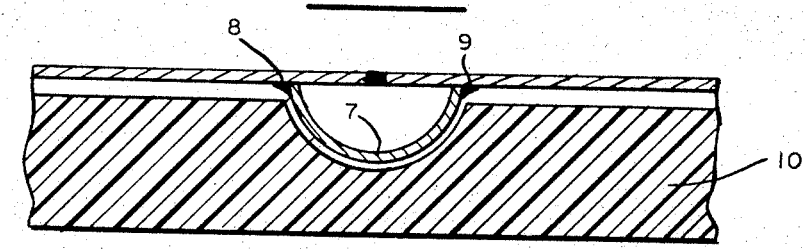
FIG. 2 represents an arrangement in cross section alternative to FIG. 1.

In FIG. 2, the hollow space is provided by a curved member 7 welded to the tank wall at 8 and 9.

Figure 4:
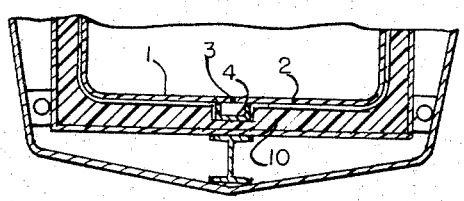
FIG. 4 is a sectional view of a marine tank embodying the invention.

The arrangements shown in FIGS. 1 and 2 when incorporated in the construction of a tank housed in the cargo hold of a marine tanker, as shown in FIG. 4, may also form part of means designed to restrain the tank against undesired displacement when the vessel is at sea. Thus in such a tanker the walls of the tank may be lined by thermal insulation shown generally at 10 and the hollow sections 4 and 7 may be so disposed as to form a key in such thermal insulation which restricts the movement of the tank in certain directions. It will also be evident that the channel section 4, for instance, need not be the same depth over the whole length of the weld 3 and that a suitably located portion or portions may be adapted to discharge the function of a key for the tank without sacrificing the utility of the arrangement for fluid-pressure testing the weld 3.

Figure 3:
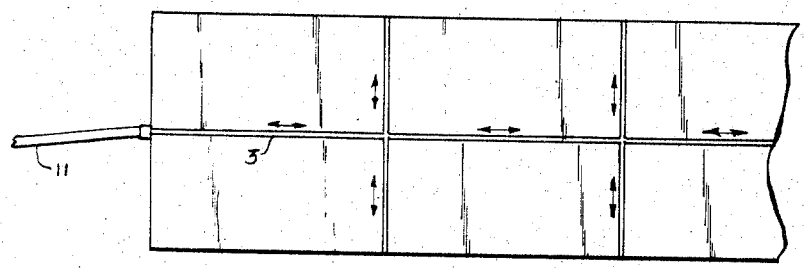
FIG. 3 is a diagrammatic representation of the base of a large self-supporting tank made up by welding together a number of rectangular plates.

The pattern of key and keyway system will in some measure be dictated by the shape and system of construction of the tank and the manner in which it is housed in a hold. In a large self-supporting tank fabricated from a number of plates the alternative posibilities of utilizing the hollow sections for the dual purposes already set forth are more numerous. Such use will generally take account of the construction and expansion of the tank under big thermal changes and the retaining system which is adopted will be devised to ensure such thermally promoted movements are uninhibited. Thus as shown in FIG. 3 the base of a tank fabricated by welding together the abutting edges of a number of rectangular plates will need at the various welds freedom of movement under thermal changes as shown by the pattern of arrows. It follows the arrangements in accordance with the present invention will preferably be so devised and utilized as to permit the tank this desired freedom. The provision of the appropriate keying systems to secure such freedom while ensuring undesired displacement does not occur is well-known in the art and need not be the subject of further elaboration here.

I claim:

1. A self-supporting tank comprising a plurality of rigid metal plates welded together at their adjacent edges to form the walls of the tank, including a rigid, generally U-shaped metal channel having the two upstanding legs of the U welded externally of the tank to two of said metal plates on opposite sides of a weld line joining said two plates, thereby forming with said plates a hollow section including the weld between said plates, and including an insulating and supporting wall external to said tank, said insulating and supporting wall having a keyway formed therein, said keyway being arranged to permit thermal expansion and contraction of the metal plates in the longitudinal direction of the keyway while retaining the tank against movement in a direction transverse to the keyway, said channel member lying in said keyway as a key member.

2. A marine tanker for the bulk transport of liquefied gases comprising:

(a) a self-supporting tank comprising a plurality of rigid metal plates welded together at their adjacent edges to form the walls of said tank, (b) a rigid, generally U-shaped metal channel having the two upstanding legs of the U welded externally of the tank to the two of said metal plates on opposite sides of each weld line joining two of said plates thereby forming with said plates a hollow section including the weld between said plates, (c) a thermally insulated cargo hold including an insulating and supporting wall external to said tank, (d) said insulating and supporting wall having a keyway formed therein for each said U-shaped member, with one of said U-shaped members lying in each said keyway as a key member, (e) each said keyway being arranged to permit thermal expansion and contraction of the metal plates in the longitudinal direction of the keyway while retaining the tank against movement in a direction transverse to the keyway.

References Cited

UNITED STATES PATENTS

| 1,902,110 | 3/1933 | Urich | 220—45 |
| 1,954,581 | 4/1934 | Wortmann | 220—14 |
| 2,186,185 | 1/1940 | Walker | 220—85 |
| 2,386,958 | 10/1945 | Jackson | 220—81 |
| 2,460,054 | 1/1949 | Wiggins | 220—81 |
| 2,954,003 | 9/1960 | Farrell et al | 220—15 |
| 3,072,282 | 1/1963 | Henry | 220—15 |
| 3,101,208 | 8/1963 | Clifford et al. | 220—80 |

FOREIGN PATENTS

| 777,879 | 12/1934 | France. |
| 930,957 | 9/1947 | France. |
| 1,157,001 | 12/1957 | France. |
| 500,884 | 2/1939 | Great Britain. |
| 329,878 | 9/1935 | Italy. |

WILLIAM T. DIXON, JR., Primary Examiner.

JAMES R. GARRETT, Assistant Examiner.